Feb. 11, 1930.                W. EVANS                 1,746,345
           MEANS FOR PREVENTING CLOGGING OF AIR CONVEYERS
                        Filed Oct. 7, 1927
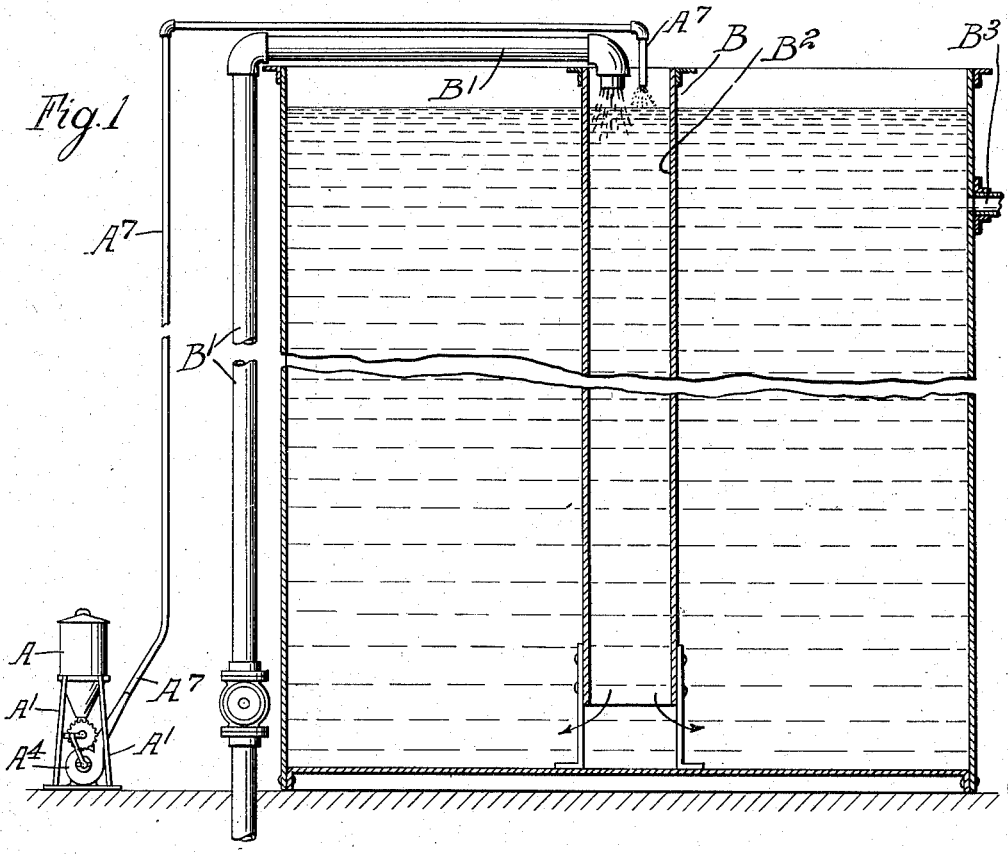
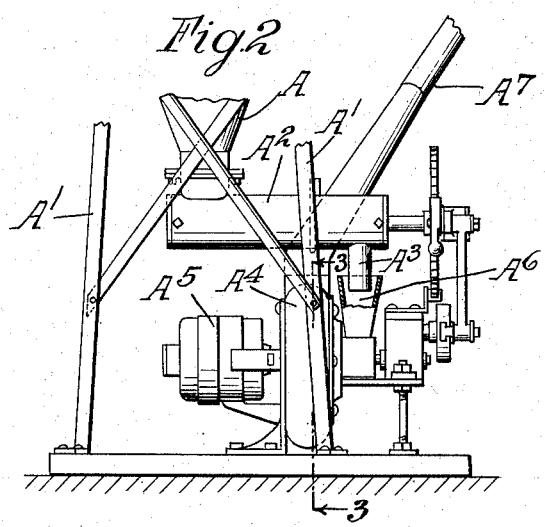
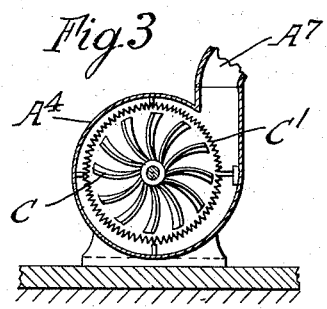
Inventor
Wilson Evans
by Parker & Carter
Attorneys.

Patented Feb. 11, 1930

1,746,345

UNITED STATES PATENT OFFICE

WILSON EVANS, OF CHICAGO, ILLINOIS, ASSIGNOR, BY MESNE ASSIGNMENTS, TO NATIONAL ALUMINATE CORPORATION, OF CHICAGO, ILLINOIS, A CORPORATION OF DELAWARE

MEANS FOR PREVENTING CLOGGING OF AIR CONVEYERS

Application filed October 7, 1927. Serial No. 224,595.

My invention relates to improvements in process and means for preventing clogging of air conveyers and has for one object to provide means whereby an intermittently operated conveying mechanism handling hydroscopic material may be protected against clogging and obstruction.

Experience shows that in handling such material as sodium aluminate for water softening, table salt or other hydroscopic materials by the use of a blower or fan which conveys a dust laden column of air, that when the apparatus is shut down for any considerable period of time, if there are changes in temperature or changes in the moisture content of the air, there is likely to be a deposit of the hydroscopic moistened material in the fan and in the conveying passages resulting from moistening of the material by water of condensation and the like.

In order to prevent this, I propose to provide means whereby the fan and the discharge system will all be constantly kept at such a temperature as will prevent the formation of water of condensation and thereby maintain a condition of dryness such that those particles of the hydroscopic material which may be left in the system when the system goes out of operation will not be permitted to absorb water and therefore not permitted to deposit or adhere to the surfaces.

I propose to do this by providing as an integral part of the fan a ring type electric heater which will surround the air intake of the fan and heat the air to some extent as it rushes in. This heater will have a continuous heating effect and will be in operation constantly but it becomes more important when the plant is shut down because it is during shut down periods that deposition and clogging takes place. Since the fan is located at the lower end of the discharge pipe, the electric heater which will keep the fan and fan chamber warm will cause convection currents of air, the heated air from the fan chamber passing up through the discharge pipe and heating it and thus maintaining the parts at all times in a condition such that no moisture will be formed and therefore no clogging take place.

My invention is illustrated more or less diagrammatically in the accompanying drawings, wherein:—

Figure 1 is a diagrammatic section through a water treating tank showing the conveyer in elevation;

Figure 2 is a diagrammatic detail of the conveyer;

Figure 3 is a diagrammatic section with parts omitted along the line 3—3 of Figure 2.

Like parts are indicated by like characters throughout the specification and drawings.

A is a receptacle mounted on a framework $A^1$ discharging dry comminuted material through a conveyer $A^2$ and spout $A^3$ to a fan $A^4$. The fan is driven by a motor $A^5$ and discharges dust and air drawn in through the funnel $A^6$ upwardly through the conveyer pipe $A^7$.

The conveyer pipe $A^7$ discharges into the top of a water treatment tank B, water coming into the tank through the pipe $B^1$ the water and air conveyed solid material passing down through the stand pipe to the bottom of the tank $B^2$, the treated water passing out through the overflow pipe $B^3$.

In the fan housing is a propeller fan C. Arranged about the intake opening to the fan and between the center of rotation of the fan and the wall of the housing is an electric coil heater $C^1$. This heater may be of any suitable type. It is preferably built into the fan housing itself and as shown extends throughout a large part of the fan chamber and surrounds the intake portion of the fan so that the air as it passes into the fan is heated by this electric heater. Since the electric heater is in constant operation whether the fan is running or not, the fan chamber and the air in it is always kept warm. Since the air intake to the fan chamber is never closed, this warm air can rise through the pipe $A^7$ and be replaced constantly by cold air coming in through the intake.

I claim:

In a pneumatic conveying system, a fan and fan chamber, the chamber having intake and discharge openings, a conduit leading from the discharge opening, an electric heater in the wall of the fan chamber and surrounding the intake opening the fan chamber being located in the low point of the system.

Signed at Chicago, county of Cook, and State of Illinois, this 5th day of October, 1927.

WILSON EVANS.